(12) United States Patent
Barth et al.

(10) Patent No.: US 10,033,657 B2
(45) Date of Patent: Jul. 24, 2018

(54) GENERATING AUTOMATIC BANDWIDTH ADJUSTMENT POLICIES PER LABEL-SWITCHED PATH

(71) Applicant: Juniper Networks, Inc., Sunnyvale, CA (US)

(72) Inventors: Jonathan C. Barth, Collegeville, PA (US); Sudhir Cheruathur, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 210 days.

(21) Appl. No.: 15/198,400

(22) Filed: Jun. 30, 2016

(65) Prior Publication Data
US 2018/0006962 A1    Jan. 4, 2018

(51) Int. Cl.
| H04L 12/911 | (2013.01) |
|---|---|
| H04L 12/723 | (2013.01) |
| H04L 12/813 | (2013.01) |
| H04L 12/841 | (2013.01) |

(52) U.S. Cl.
CPC ............ H04L 47/726 (2013.01); H04L 45/50 (2013.01); H04L 47/20 (2013.01); H04L 47/28 (2013.01)

(58) Field of Classification Search
CPC .............................. H04L 47/726; H04L 47/28
See application file for complete search history.

(56) References Cited

U.S. PATENT DOCUMENTS

| 6,665,273 B1 * | 12/2003 | Goguen ................. H04L 45/00 370/252 |
|---|---|---|
| 7,463,591 B1 | 12/2008 | Kompella et al. |
| 7,839,780 B2 | 11/2010 | Natarajan et al. |
| 7,907,526 B2 | 3/2011 | Kolenchery et al. |
| 8,000,240 B2 | 8/2011 | DelRegno et al. |
| 8,149,706 B2 | 4/2012 | Turlington et al. |
| 9,838,299 B2 * | 12/2017 | Alvarez ................. H04L 45/123 |
| 2006/0028987 A1 * | 2/2006 | Alexander Gildfind ............. H04L 41/0896 370/232 |

(Continued)

FOREIGN PATENT DOCUMENTS

GB    2 374 243    10/2002

OTHER PUBLICATIONS

Extended European Search Report corresponding to EP 16193852.7 dated Jun. 1, 2017, 9 pages.

(Continued)

*Primary Examiner* — Andrew Lai
*Assistant Examiner* — Zhiren Qin
(74) *Attorney, Agent, or Firm* — Harrity & Harrity, LLP

(57) ABSTRACT

A device may identify a plurality of first values associated with network traffic of a label-switched path of a plurality of label-switched paths. The device may determine an adjustment policy based on the plurality of first values. The adjustment policy may include one or more factors associated with a plurality of second values. The plurality of second values may be determined based on the plurality of first values. The device may implement the adjustment policy in association with the label-switched path. A bandwidth reservation of the label-switched path may be adjusted based on the adjustment policy. The adjustment policy may be implemented for fewer than all of the plurality of label-switched paths.

20 Claims, 5 Drawing Sheets

(56) References Cited

U.S. PATENT DOCUMENTS

| | | | |
|---|---|---|---|
| 2006/0291391 A1* | 12/2006 | Vasseur | H04L 45/02 370/235 |
| 2010/0002580 A1* | 1/2010 | DelRegno | H04L 41/0896 370/230 |
| 2010/0002724 A1* | 1/2010 | Turlington | H04L 12/4633 370/468 |
| 2010/0058396 A1* | 3/2010 | Russell | H04L 12/2861 725/60 |
| 2011/0063986 A1 | 3/2011 | Denecheau et al. | |
| 2013/0223221 A1 | 8/2013 | Xu et al. | |
| 2015/0146536 A1 | 5/2015 | Minei et al. | |

OTHER PUBLICATIONS

Dhody et al., "PCEP Extensions for MPLS-TE LSP Automatic Bandwidth Adjustment with Stateful PCE," https://tools.ietf.org/html/draft-dhody-pce-stateful-pce-auto-bandwidth-07, Feb. 29, 2016, 33 pages.

* cited by examiner

GENERATING AUTOMATIC BANDWIDTH ADJUSTMENT POLICIES PER LABEL-SWITCHED PATH

BACKGROUND

Automatic bandwidth allocation may enable a device associated with a label-switched path (LSP) to automatically adjust a bandwidth reservation based on an amount of network traffic associated with the LSP. At the expiration of an adjustment interval, a maximum average bandwidth may be compared to a reserved bandwidth of the LSP. If the LSP requires additional bandwidth, a new path may be set up based on the maximum average bandwidth.

SUMMARY

According to some possible implementations, a device may include one or more processors to receive information that identifies network traffic behavior associated with a label-switched path of a plurality of label-switched paths. The network traffic behavior may be associated with a plurality of first values associated with network traffic of the label-switched path. The one or more processors may determine an automatic bandwidth adjustment policy based on the network traffic behavior. The automatic bandwidth adjustment policy may include multiple factors. The multiple factors may be associated with a plurality of second values. The plurality of second values may be determined based on the plurality of first values. The one or more processors may implement the automatic bandwidth adjustment policy in association with the label-switched path, of the plurality of label-switched paths. Implementing the automatic bandwidth adjustment policy may cause a bandwidth reservation of the label-switched path to be adjusted based on the automatic bandwidth adjustment policy. The automatic bandwidth adjustment policy may be implemented for fewer than all of the plurality of label-switched paths.

According to some possible implementations, a non-transitory computer-readable medium may store one or more instructions that, when executed by one or more processors of a first device, cause the one or more processors to receive, from a second device, a plurality of bandwidth usage values associated with a plurality of label-switched paths. The one or more instructions may cause the one or more processors to determine an automatic bandwidth adjustment policy based on the plurality of bandwidth usage values. The automatic bandwidth adjustment policy may include multiple factors. The multiple factors may be associated with a plurality of second values. The plurality of second values may be determined based on the plurality of bandwidth usage values. The one or more instructions may cause the one or more processors to provide, to the second device, information that identifies the automatic bandwidth adjustment policy and that causes the second device to adjust a bandwidth reservation of a label-switched path, of the plurality of label-switched paths, based on the automatic bandwidth adjustment policy.

According to some possible implementations, a method may include identifying, by a device, a plurality of first values associated with network traffic of a label-switched path of a plurality of label-switched paths. The method may include determining, by the device, an adjustment policy based on the plurality of first values. The adjustment policy may include one or more factors associated with a plurality of second values. The plurality of second values may be determined based on the plurality of first values. The method may include implementing, by the first device, the adjustment policy in association with the label-switched path. A bandwidth reservation of the label-switched path may be adjusted based on the adjustment policy. The adjustment policy may be implemented for fewer than all of the plurality of label-switched paths.

DETAILED DESCRIPTION

The following detailed description of example implementations refers to the accompanying drawings. The same reference numbers in different drawings may identify the same or similar elements.

A network device (e.g., an ingress label switch router (LSR)) may implement an automatic bandwidth adjustment policy (e.g., "policy") that may enable the network device to adjust a bandwidth reservation of an LSP based on monitoring bandwidth usage of the LSP. For example, the network device may determine a bandwidth usage value of the LSP at a sample interval (e.g., every five minutes), and may adjust a bandwidth reservation of the LSP at the end of an adjustment interval (e.g., two hours). In this way, a bandwidth reservation of the LSP may be adjusted based on actual demand of the LSP.

In some cases, a network operator may apply a universal policy to multiple LSPs associated with a network (e.g., a multiprotocol label switching (MPLS) network). For example, network traffic, associated with each LSP, may be sampled at a same sampling interval value, compared to a same threshold value, or the like, and/or a bandwidth reservation for each LSP may be adjusted according to a same adjustment interval value, or the like. Additionally, the same policy may be applied to multiple LSPs irrespective of characteristics and/or types of network traffic associated with each LSP. As an example, an LSP carrying streaming media traffic may exhibit different network traffic behavior than an LSP carrying virtual private network (VPN) traffic. Additionally, an LSP may exhibit different network traffic behavior based on a particular time frame (e.g., a time of day, a day of the week, a month, or the like). Thus, bandwidth usage of an LSP may be sampled too frequently or infrequently, and/or a bandwidth reservation of the LSP may be adjusted too frequently or infrequently based on the universal policy, thereby consuming processor and/or memory resources of network devices and/or network resources.

Implementations described herein enable a traffic profiling device to receive information that identifies network traffic behavior associated with an LSP, determine a policy based on the network traffic behavior, and implement the policy in association with the LSP. Thus, implementations described herein enable a network device to implement a policy that aligns with actual network traffic behavior of an LSP, may reduce a quantity of situations where too much or too little bandwidth is reserved for an LSP, may reduce situations where bandwidth usage of an LSP is sampled too frequently or infrequently, and/or may reduce a quantity of unnecessary bandwidth reservation adjustments associated with an LSP, thereby conserving processor and/or memory resources of network devices and/or network resources.

Figure 1A:
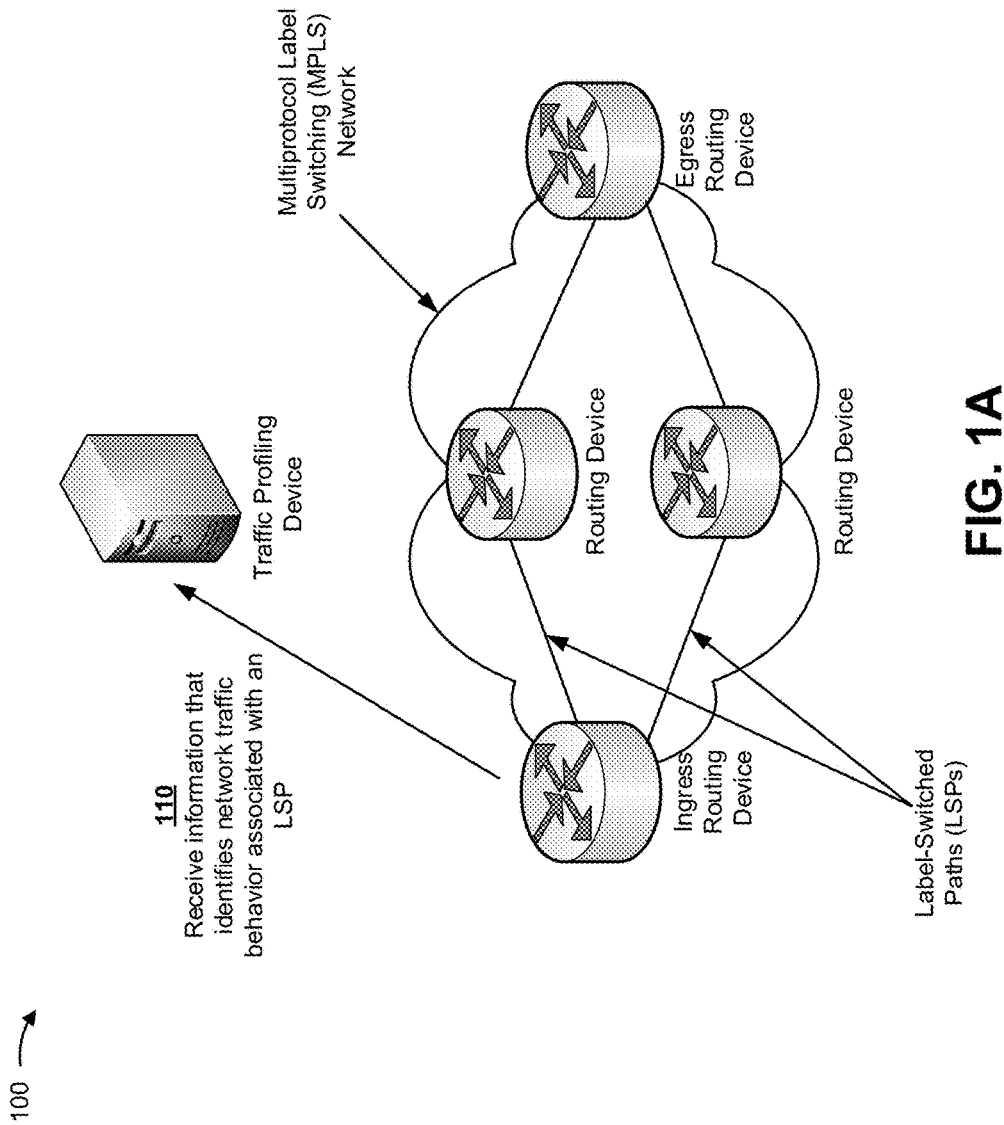
FIGS. 1A and 1B are diagrams of an overview of an example implementation described herein.
Figure 1B:
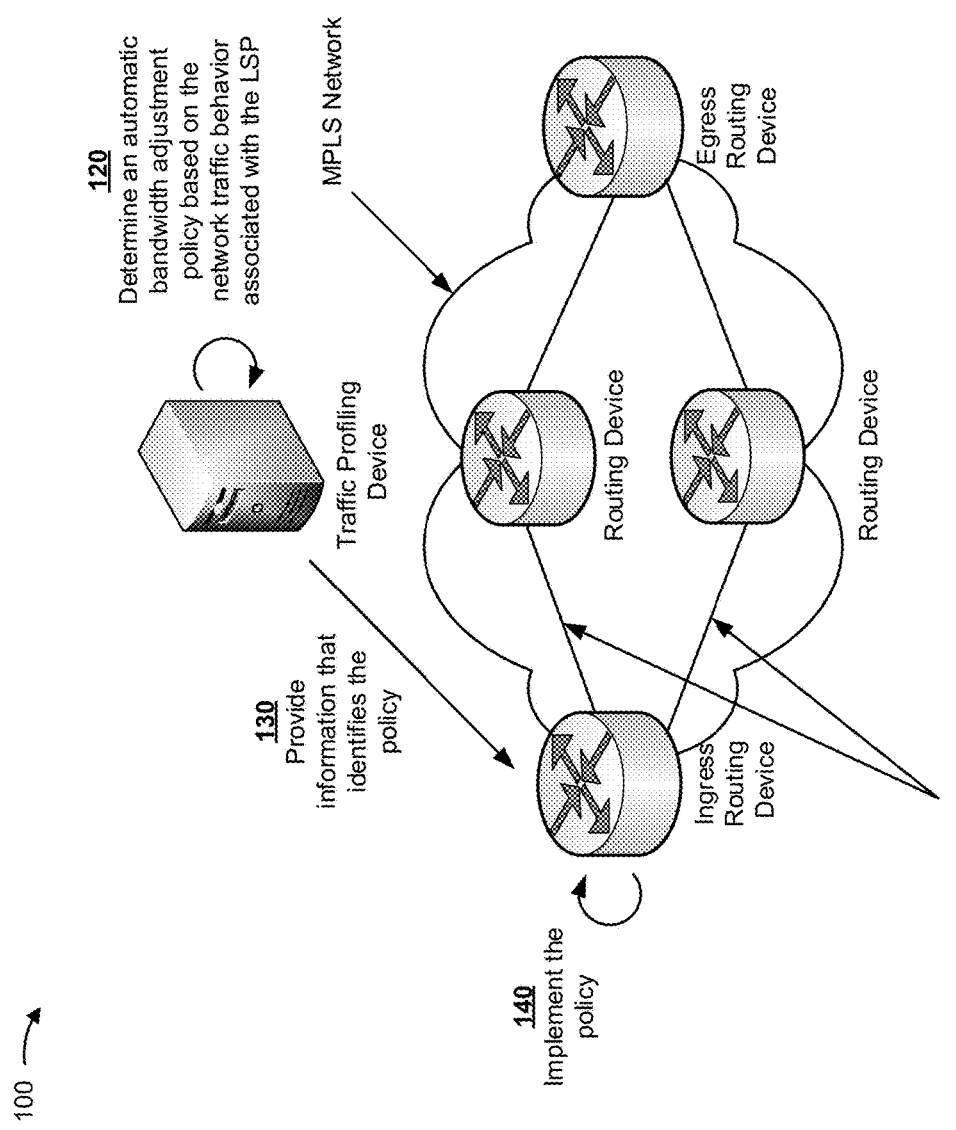

FIGS. 1A and 1B are diagrams of an overview of an example implementation 100 described herein. As shown in FIG. 1A, and by reference number 110, a traffic profiling device (e.g., a server device) may receive information that identifies network traffic behavior associated with an LSP. As shown, an ingress routing device (e.g., an ingress LSR) may sample network traffic associated with particular LSPs, and may determine bandwidth usage values associated with the LSPs. For example, the ingress routing device may receive network traffic (e.g., streaming media traffic, voice over internet protocol (VoIP) traffic, or the like) from another routing device, such as a customer edge routing device (not shown). Additionally, the ingress routing device may attach a particular label, that corresponds to a particular LSP, to the network traffic based on a characteristic and/or type of the network traffic. The ingress routing device may provide, to the traffic profiling device, information that identifies bandwidth usage values associated with the LSPs across particular time frames. The traffic profiling device may analyze the information, and may determine network traffic behavior associated with the LSPs (e.g., bandwidth usage values, variations in bandwidth usage values across time frames, etc.).

As shown in FIG. 1B, and by reference number 120, the traffic profiling device may determine an automatic bandwidth adjustment policy based on the network traffic behavior associated with the LSP. The policy may include multiple factors (and corresponding values) that may be used by the ingress routing device to adjust a bandwidth reservation associated with the LSP based on bandwidth usage values of the LSP. As an example, the policy may include a sample interval value, an adjustment interval value, an adjustment threshold value, an overflow threshold value, an underflow threshold value, and/or another value, as described elsewhere herein. In some implementations, the traffic profiling device may determine a value associated with a factor based on analyzing bandwidth usage values of the LSP, as described elsewhere herein.

As further shown in FIG. 1B, and by reference number 130, the traffic profiling device may provide, to the ingress routing device, information that identifies the policy. As shown by reference number 140, the ingress routing device may implement the policy. For example, the ingress routing device may sample network traffic associated with the LSP in accordance with a sample interval value, may adjust a bandwidth reservation of the LSP at an expiration of an adjustment interval, may determine whether bandwidth usage values satisfy threshold values, or the like. In this way, the ingress routing device may implement a policy that is tailored to a particular LSP, which may reduce unnecessary sampling, may reduce unnecessary adjustment of bandwidth reservations, or the like.

Implementations described herein enable a traffic profiling device to determine a policy for an LSP based on actual network traffic behavior associated with the LSP. Implementations described herein may reduce situations where too much or too little bandwidth is reserved for a particular LSP, and/or may reduce a quantity of signaling messages (e.g., reservation adjustment signaling messages, or the like), thereby conserving processor and/or memory resources of network devices and/or conserving network resources.

As indicated above, FIGS. 1A and 1B are provided merely as an example. Other examples are possible and may differ from what was described with regard to FIGS. 1A and 1B.

Figure 2:
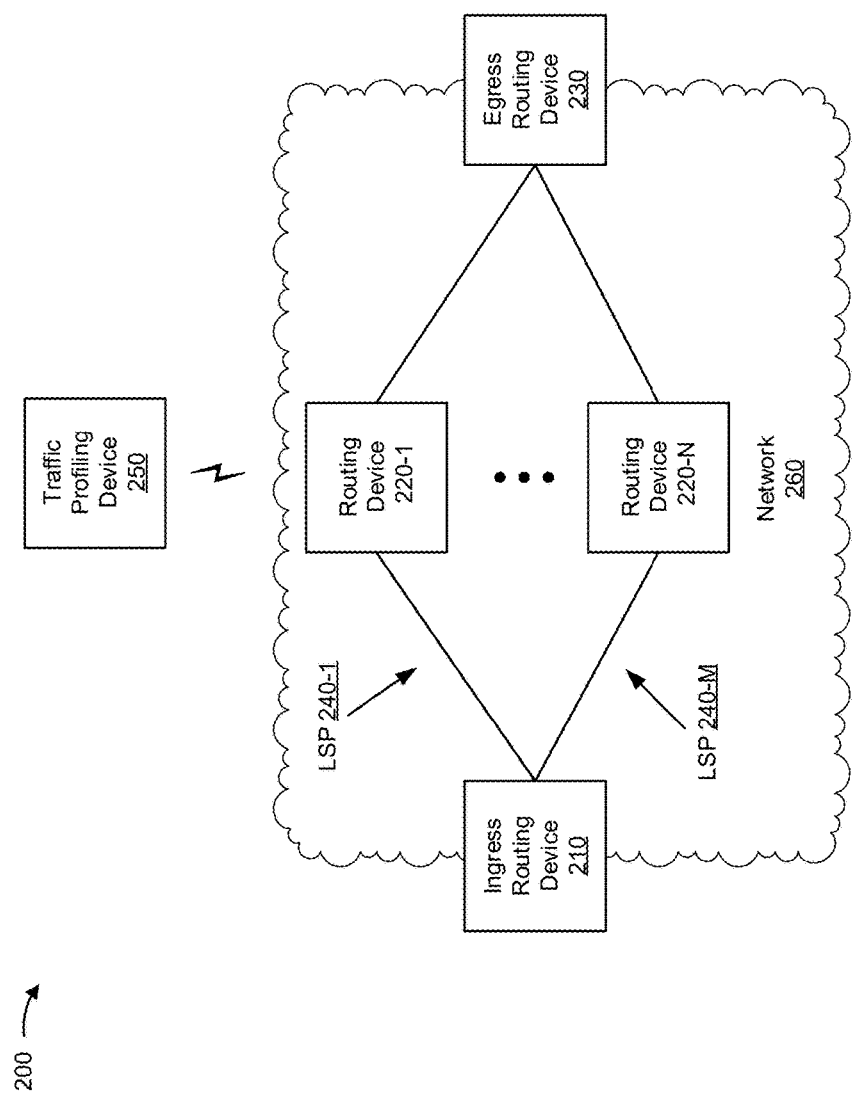
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ingress routing device 210, one or more routing devices 220-1 through 220-N (N≥1) (hereinafter referred to collectively as "routing devices 220," and individually as "routing device 220"), an egress routing device 230, a traffic profiling device 250, one or more label-switched paths (LSPs) 240-1 through 240-M (M≥1) (hereinafter referred to collectively as "LSPs 240," and individually as "LSP 240"), and a network 260. Devices of environment 200 may interconnect via wired connections, wireless connections, or a combination of wired and wireless connections.

Ingress routing device 210 includes one or more network devices (e.g., one or more traffic transfer devices) capable of processing and transferring network traffic (e.g., packets). For example, ingress routing device 210 may include a router (e.g., an ingress LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, ingress routing device 210 may provide, to traffic profiling device 250, information that identifies network traffic behavior associated with LSP 240. Additionally, or alternatively, ingress routing device 210 may receive, from traffic profiling device 250, information that identifies a policy (e.g., determined by traffic profiling device 250 based on the network traffic behavior). Additionally, or alternatively, ingress routing device 210 may determine a policy based on monitoring network traffic behavior associated with LSP 240, and may implement the policy. In some implementations, ingress routing device 210 may serve as a point of ingress to network 260 (e.g., an MPLS network).

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Routing device 220 includes one or more network devices (e.g., one or more traffic transfer devices) capable of processing and transferring network traffic. For example, routing device 220 may include a router (e.g., an LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, routing device 220 may route packets within network 260 (e.g., an MPLS network).

Egress routing device 230 includes one or more network devices (e.g., one or more traffic transfer devices) capable of processing and transferring network traffic. For example, egress routing device 230 may include a router (e.g., an egress LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, egress routing device 230 may serve as a point of egress from network 260 (e.g., an MPLS network).

LSP 240 includes one or more paths through network 260 (e.g., used by ingress routing device 210, routing device 220, and/or egress routing device 230 to carry network traffic). In some implementations, LSP 240 may include one or more paths associated with a flow of MPLS traffic.

Traffic profiling device 250 includes one or more devices capable of analyzing network traffic. For example, traffic profiling device 250 may include one or more network devices (e.g., one or more traffic transfer devices) and/or one or more computing devices. For example, traffic profiling device 250 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

In some implementations, traffic profiling device 250 may receive, from ingress routing device 210, information that identifies network traffic behavior associated with LSP 240. Additionally, or alternatively, traffic profiling device 250 may determine a policy associated with LSP 240 based on the network traffic behavior. In some implementations, traffic profiling device 250 may monitor bandwidth usage values of LSP 240, and may adjust a bandwidth reservation of LSP 240 based on a policy. Additionally, or alternatively, traffic profiling device 250 may provide, to ingress routing device 210, information that identifies a policy, and ingress routing device 210 may implement the policy. In some implementations, traffic profiling device 250 may be integrated into and a part of one or more other devices shown in environment 200, such as ingress routing device 210, routing device 220, and/or egress routing device 230.

Network 260 includes a network associated with routing and/or forwarding traffic. For example, network 260 may a multi-protocol label switching (MPLS) based network, an internet protocol (IP) based network, and/or another type of network through which traffic may travel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
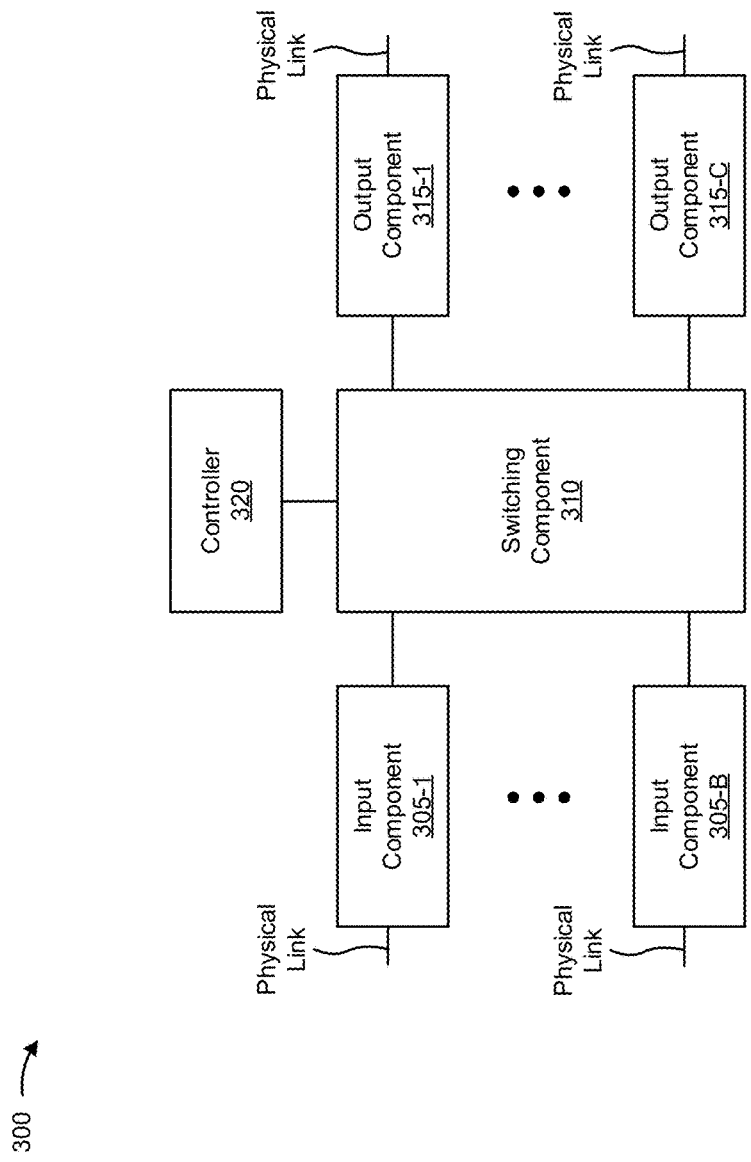
FIG. 3 is a diagram of example components of one or more devices of FIG. 2.

FIG. 3 is a diagram of example components of a device 300. Device 300 may correspond to ingress routing device 210, routing device 220, egress routing device 230, and/or traffic profiling device 250. In some implementations, ingress routing device 210, routing device 220, egress routing device 230, and/or traffic profiling device 250 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
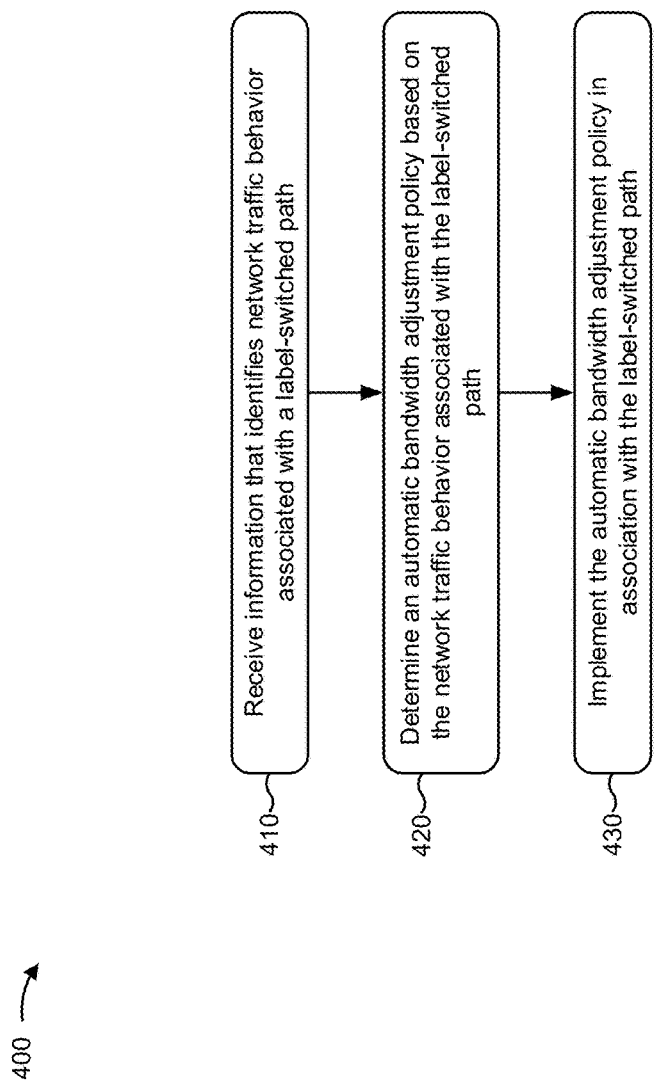
FIG. 4 is a flow chart of an example process for generating automatic bandwidth adjustment policies per label-switched path.

FIG. 4 is a flow chart of an example process 400 for generating automatic bandwidth adjustment policies per label-switched path. In some implementations, one or more process blocks of FIG. 4 may be performed by traffic profiling device 250. In some implementations, one or more process blocks of FIG. 4 may be performed by another device or a group of devices separate from or including traffic profiling device 250, such as ingress routing device 210, routing device 220, and/or egress routing device 230.

As shown in FIG. 4, process 400 may include receiving information that identifies network traffic behavior associated with a label-switched path (block 410). For example, traffic profiling device 250 may receive, from ingress routing device 210, information that identifies network traffic behavior associated with LSP 240. Additionally, or alternatively, traffic profiling device 250 may receive the information that identifies the network traffic behavior from another device associated with LSP 240, such as routing device 220 and/or egress routing device 230.

In some implementations, ingress routing device 210 may store (e.g., in a data structure, such as a routing table, a forwarding table, a label information database (LIB), or the like) information that identifies multiple LSPs 240 associated with network 260. Additionally, or alternatively, ingress routing device 210 may receive network traffic from another device (e.g., a customer edge device, or the like), and may determine a characteristic associated with the network traffic. For example, ingress routing device 210 may determine, for the network traffic, a forwarding equivalence class (FEC) value, a quality of service (QoS) value, a class of service (CoS) value, a differentiated services code point (DSCP) value, or the like. Additionally, or alternatively, ingress routing device 210 may determine a type of the network traffic (e.g., streaming media traffic, VoIP traffic, internet protocol security (IPsec) traffic, virtual private network (VPN) traffic, teleconference traffic, or the like).

In some implementations, ingress routing device 210 may determine a particular LSP 240 to transport the network traffic based on the characteristic and/or the type of network traffic. Ingress routing device 210 may attach a particular label, that corresponds to the particular LSP 240, to the network traffic (e.g., may perform a push operation on a label stack). Ingress routing device 210 may provide the network traffic to a particular routing device 220 based on the label (e.g., may provide the network traffic to a next hop for a tunnel associated with LSP 240). One or more routing devices 220 may forward the network traffic through network 260 based on labels attached to the network traffic. In this way, a particular LSP 240 may identify a specific path that includes a set of routing devices 220 in network 260.

In some implementations, LSP 240 may be set up based on a signaling protocol, such as resource reservation protocol-traffic engineering (RSVP-TE), label distribution protocol (LDP), constraint-based routing label distribution protocol (CR-LDP), border gateway protocol (BGP), or the like. Additionally, or alternatively, LSP 240 may be configured (e.g., based on input provided by a network operator) with a bandwidth reservation (e.g., a reserved bandwidth allocation). Additionally, or alternatively, a bandwidth reservation of LSP 240 may be adjusted based on a policy.

In some implementations, automatic bandwidth adjustment may be enabled in association with LSP 240. Additionally, ingress routing device 210 and/or traffic profiling device 250 may implement a policy, and may adjust the bandwidth reservation of LSP 240 based on the policy. For example, ingress routing device 210 and/or traffic profiling device 250 may sample network traffic, and may determine bandwidth usage values associated with LSP 240. Additionally, ingress routing device 210 and/or traffic profiling device 250 may adjust a bandwidth reservation of LSP 240 based on the bandwidth usage values of LSP 240 in accordance with the policy.

In some implementations, traffic profiling device 250 may determine information that identifies network traffic behavior associated with a particular LSP 240. For example, ingress routing device 210 may sample network traffic (e.g., based on a sampling interval, such as every 5 minutes, 10 minutes, 30 minutes, etc.), and may determine a bandwidth usage value associated with a particular LSP 240 (e.g., a sampled bandwidth usage value). In some implementations, ingress routing device 210 may provide, to traffic profiling device 250, information that identifies the sampled bandwidth usage values. For example, ingress routing device 210 may provide information associated with LSP 240 to traffic profiling device 250 using a transport protocol (e.g., path computation element communication protocol (PCEP), or the like).

In some implementations, traffic profiling device 250 may determine network traffic behavior based on the received bandwidth usage values and/or one or more other network metrics (e.g., jitter, latency, packet loss, delay, etc.) associated with LSP 240. For example, network traffic behavior may refer to bandwidth usage values of LSP 240 in relation to a particular time frame (e.g., a sample interval, a set of sample intervals, a time of day, a day, a week, a month, etc.). Additionally, or alternatively, network traffic behavior may refer to a variation (e.g., a rate of change) of bandwidth usage values across time frames (e.g., across sample intervals, across sets of sample intervals, etc.). In some implementations, traffic profiling device 250 may store (e.g., in a data structure) information that identifies the network traffic behavior associated with LSP 240. Additionally, or alternatively, traffic profiling device 250 may analyze the information that identifies the network traffic behavior associated with LSP 240, and may determine a policy, as described below.

As further shown in FIG. 4, process 400 may include determining an automatic bandwidth adjustment policy based on the network traffic behavior associated with the label-switched path (block 420). For example, traffic profiling device 250 may determine a policy based on the information that identifies the network traffic behavior associated with LSP 240. In some implementations, traffic profiling device 250 may analyze the information, and may develop a model (e.g., a behavioral model) of the network traffic behavior associated with LSP 240.

In some implementations, the policy may include multiple factors (e.g., a sample interval value, an adjustment interval value, a threshold value, and/or another value) that may be used to adjust a bandwidth reservation associated with LSP 240. For example, ingress routing device 210 and/or traffic profiling device 250 may implement the policy, and may adjust the bandwidth reservation of LSP 240 based on factors associated with the policy. Additionally, traffic profiling device 250 may determine the multiple factors based on the model of the network traffic behavior of LSP 240.

In some implementations, traffic profiling device 250 may determine a value associated with a factor, as described below. For example, traffic profiling device 250 may determine a value associated with a factor based on the network traffic behavior (e.g., values associated with the sampled network traffic). Additionally, or alternatively, traffic profiling device 250 may determine that a sampled bandwidth usage value (or values) is within a particular range of values, satisfies a threshold value, etc., and may determine a value associated with a factor based on the sampled bandwidth usage value being within the particular range of values, satisfying the threshold value, etc. For example, traffic profiling device 250 may store template policies (e.g., values associated with factors), and may apply a template policy based on the sampled bandwidth usage values. In some implementations, traffic profiling device 250 may determine a value associated with a factor based on a characteristic and/or type of the network traffic.

In some implementations, traffic profiling device 250 may determine a sample interval value. A sample interval may include a periodic time interval at which network traffic associated with LSP 240 is to be sampled for automatic bandwidth adjustment. For example, a sample interval may include a frequency at which bandwidth usage samples are collected (e.g., every thirty seconds, every five minutes, every ten minutes, etc.). In some implementations, traffic profiling device 250 may determine a sample interval value based on a variation of the sampled bandwidth usage values (e.g., sampled by ingress routing device 210) across a time frame. As an example, traffic profiling device 250 may determine a larger sample interval value for a first LSP 240, that exhibits less variation of bandwidth usage values across a time frame, as compared to a second LSP 240 that exhibits more variation of bandwidth usage values across a time frame (e.g., because the first LSP 240 exhibits more stable behavior).

In some implementations, traffic profiling device 250 may determine an adjustment interval value. An adjustment interval may include a time period at which a bandwidth reservation adjustment is to be performed. For example, upon the expiration of an adjustment interval, traffic profiling device 250 and/or ingress routing device 210 may adjust a bandwidth reservation of LSP 240. In some implementations, traffic profiling device 250 may determine an adjustment interval value based on an amount of time that bandwidth usage values, associated with LSP 240, are within a particular percentage (e.g., five percent, ten percent, fifteen percent, etc.) of a particular bandwidth usage value (e.g., a maximum average bandwidth value, or the like) and/or are within a particular range of values.

Additionally, or alternatively, traffic profiling device 250 may determine an adjustment interval value based on a variation of bandwidth usage values across a time frame. Additionally, traffic profiling device 250 may determine a time frame, where the variation in bandwidth usage values satisfies a particular threshold value (e.g., is less than a particular value), and may determine the adjustment interval value based on the time frame. For example, traffic profiling device 250 may determine an amount of time where bandwidth usage values are within a threshold range.

As an example, if traffic profiling device 250 determines that bandwidth usage values are consistent across samples (e.g., are within a particular percentage of a particular value, or within a range of values) for a particular time frame, then traffic profiling device 250 may set the adjustment interval value to the time frame. In this way, traffic profiling device 250 may determine an adjustment interval value that reduces a quantity of signaling messages (e.g., associated with bandwidth reservation adjustment) based on identifying time frames for which the network traffic behavior is stable (e.g., is unlikely to be associated with a bandwidth usage value that may prematurely expire the adjustment interval).

In some implementations, traffic profiling device 250 may determine a maximum bandwidth value. A maximum bandwidth value may indicate the maximum bandwidth that may be reserved for LSP 240. Additionally, or alternatively, traffic profiling device 250 may determine a minimum bandwidth value, which may indicate the minimum bandwidth that may be reserved for LSP 240. In some implementations, traffic profiling device 250 may determine the maximum bandwidth value and/or the minimum bandwidth value based on maximum bandwidth usage values (e.g., determined over a period of time), minimum bandwidth usage values (e.g., determined over a period of time), capacities associated with network links, or the like.

In some implementations, traffic profiling device 250 may determine an adjustment threshold value. An adjustment threshold value may include a value that, if satisfied by a difference between a sampled bandwidth usage value and a reserved bandwidth value of LSP 240, causes the reserved bandwidth value of LSP 240 to be adjusted at the expiration of an adjustment interval. In some implementations, traffic profiling device 250 may determine an adjustment threshold value based on an average variation of bandwidth usage values across time frames. As an example, traffic profiling device 250 may determine an average variation of bandwidth usage values between samples, may determine a quantity of samples that include bandwidth usage values that satisfy the average variation, and may determine an adjustment threshold value based on the average variation and/or the quantity of samples. In this way, traffic profiling device 250 may determine an adjustment threshold value that may reduce a quantity of false positives (e.g., bandwidth reservation adjustments that are made based on an outlier sample).

In some implementations, traffic profiling device 250 may determine an overflow threshold value. An overflow threshold value may include a value that, if satisfied by a difference between a sampled bandwidth value and a current bandwidth reservation value of LSP 240, causes the adjustment interval to expire (e.g., prematurely) and a bandwidth reservation of LSP 240 to be adjusted (e.g., increased). In some implementations, traffic profiling device 250 may determine an overflow threshold value based on variations of bandwidth usage values across time frames.

As an example, traffic profiling device 250 may determine an overflow threshold value based on an average variation between a minimum bandwidth usage value and a maximum bandwidth usage value for multiple sets of samples (e.g., growth periods). For example, traffic profiling device 250 may determine an average increase in bandwidth usage values across a time frame, and may determine an overflow threshold value based on the average increase. In this way, traffic profiling device 250 may determine an overflow threshold value that may reduce a quantity of false positives.

In some implementations, traffic profiling device 250 may determine an overflow count value. An overflow count value may represent a quantity of bandwidth usage samples, that include bandwidth usage values that satisfy the overflow threshold value, required to be collected in order to expire the adjustment interval (e.g., prematurely expire the adjustment interval). As an example, traffic profiling device 250 may determine an average variation between bandwidth usage values across a time frame, and may determine a quantity of samples that include bandwidth usage values that satisfy the average variation. Additionally, traffic profiling device 250 may determine the overflow count value based on the quantity of samples. In this way, traffic profiling device 250 may determine an overflow count value that may prevent an adjustment interval from being prematurely expired based on outlier samples (e.g., a particular quantity of samples that include bandwidth usage values that do not accurately reflect bandwidth demand of the LSP).

In some implementations, traffic profiling device 250 may determine an underflow threshold value. An underflow threshold value may include a value that, if satisfied by a difference between a bandwidth usage value and a current bandwidth reservation value of LSP 240, causes the adjustment interval to expire (e.g., prematurely) and a bandwidth reservation of LSP 240 to be adjusted (e.g., decreased). In some implementations, traffic profiling device 250 may determine an underflow threshold value based on variations of bandwidth usage values across time frames.

As an example, traffic profiling device 250 may determine an underflow threshold value based on an average variation between a maximum bandwidth usage value and a minimum bandwidth usage value for multiple sets of samples. For example, traffic profiling device 250 may determine an average decrease in bandwidth usage values across a time frame, and may determine an underflow threshold value based on the average decrease. In this way, traffic profiling device 250 may determine an underflow threshold value that may reduce a quantity of false positives.

In some implementations, traffic profiling device 250 may determine an underflow count value. An underflow count value may represent a quantity of bandwidth usage samples, that include bandwidth values that satisfy the underflow threshold value, required to be collected in order to expire the adjustment interval (e.g., prematurely expire the adjustment interval). As an example, traffic profiling device 250 may determine an average variation between bandwidth usage values across a time frame, and may determine a quantity of samples that include bandwidth usage values that satisfy the average variation. Additionally, traffic profiling device 250 may determine the underflow count value based on the quantity of samples. In this way, traffic profiling device 250 may determine an underflow count value that may prevent an adjustment interval from being prematurely expired based on outlier samples.

In some implementations, traffic profiling device 250 may determine a policy for LSP 240 based on determining values for one or more of the above factors. For example, traffic profiling device 250 may determine values for various factors (e.g., a sample interval value, an adjustment interval value, a maximum bandwidth value, a minimum bandwidth value, an adjustment threshold value, an overflow threshold value, an overflow count value, an underflow threshold value, an underflow count value, and/or the like). Additionally, or alternatively, traffic profiling device 250 may adjust a policy based on determining one or more of the above factors. In this way, traffic profiling device 250 may determine a policy based on analyzing network traffic behavior associated with LSP 240, and/or based on a model associated with LSP 240. In this way, traffic profiling device 250 may determine a policy for LSP 240 that aligns with actual network traffic behavior of LSP 240. Additionally, in this way, traffic profiling device 250 may determine a policy that enables a bandwidth reservation of LSP 240 to be more accurately adjusted (e.g., by reducing false positives, reducing unnecessary sampling, etc.), thereby conserving processor and/or memory resources of network devices and/or network resources.

In some implementations, traffic profiling device 250 may receive information that identifies network traffic behavior associated with multiple LSPs 240, and may determine corresponding policies for each LSP 240. For example, traffic profiling device 250 may determine a first policy for a first LSP 240 and may determine a second policy for a second LSP 240 (e.g., a different policy for the second LSP 240). Additionally, or alternatively, traffic profiling device 250 may implement a policy for one or more LSPs 240. For example, traffic profiling device 250 may implement a policy for fewer than a total quantity of LSPs 240 associated with network 260.

In some implementations, traffic profiling device 250 may determine a policy based on one or more techniques (e.g., algorithms, machine learning, computational statistics, etc.). For example, traffic profiling device 250 may implement a technique that determines the policy (e.g., factors and corresponding values) based on the network traffic behavior (e.g., bandwidth usage values). In some implementations, the technique may receive, as input, information identifying known network traffic behavior and known policies, and may correlate the known network traffic behavior with the known policies (e.g., using machine learning, computational statistics, or the like).

In some implementations, traffic profiling device 250 may determine multiple policies for LSP 240. For example, traffic profiling device 250 may determine a policy based on a time frame (e.g., a time of day, a time of week, a time of month, etc.). In some implementations, LSP 240 may include network traffic behavior models that differ based on the time frame. As an example, a particular LSP 240 associated with VPN traffic may exhibit different network traffic behavior based on a day of the week. In this case, traffic profiling device 250 may determine multiple policies for LSP 240, and may implement a particular policy based on the time frame. As another example, assume that another LSP 240, that carries streaming media traffic, exhibits different network traffic behavior based on the time of day. In this case, traffic profiling device 250 may determine multiple policies for LSP 240, and may implement a particular policy based on the time of day.

In some implementations, traffic profiling device 250 may determine an updated policy based on implementing a policy. For example, traffic profiling device 250 may determine a policy, may implement the policy (as described elsewhere herein), and may determine an updated policy based on receiving additional information that identifies network traffic behavior. Additionally, or alternatively, traffic profiling device 250 may determine an updated policy based on statistics associated with the policy (e.g., the implemented policy). For example, traffic profiling device 250 may determine a quantity of bandwidth reservation adjustments that were made in accordance with the policy, a quantity of premature expirations of the adjustment interval (e.g., based on an overflow threshold value or an underflow threshold value being satisfied), or the like. In this way, traffic profiling device 250 may determine an updated policy that reduces a quantity of bandwidth adjustments, reduces a quantity of premature expirations of the adjustment interval, or the like, thereby conserving processor and/or memory resources of network devices, and/or network resources.

As further shown in FIG. 4, process 400 may include implementing the automatic bandwidth adjustment policy in association with the label-switched path (block 430). For example, traffic profiling device 250 may provide, to ingress routing device 210, information that identifies the policy, and ingress routing device 210 may implement the policy. In some implementations, traffic profiling device 250 may provide, using a transport protocol, information that identifies one or more values associated with corresponding factors. Additionally, or alternatively, traffic profiling device 250 may provide one or more instructions, regarding the policy, to ingress routing device 210, thereby causing ingress routing device 210 to implement the policy.

In some implementations, ingress routing device 210 may store information associated with the policy (e.g., based on information received from traffic profiling device 250), and may implement the policy. For example, ingress routing device 210 may monitor network traffic, and may cause a bandwidth reservation of LSP 240 to be adjusted in accordance with the policy. In some implementations, ingress routing device 210 may monitor network traffic, and may adjust an attribute of LSP 240 based on the policy. For example, ingress routing device 210 may adjust a bandwidth reservation of LSP 240, a path associated with LSP 240 (e.g., using RSVP-TE signaling), a quantity of associated LSPs 240 (e.g., sub-LSPs 240 included in an LSP grouping), or the like, based on the policy.

In some implementations, ingress routing device 210 may sample network traffic, and may provide information associated with the sampled network traffic to traffic profiling device 250 (e.g., may delegate implementation of the policy to traffic profiling device 250). Additionally, or alternatively, traffic profiling device 250 may monitor network traffic associated with LSP 240 and may implement the policy (e.g., may adjust attributes of LSP 240 based on the policy). For example, traffic profiling device 250 may store information that identifies the policy, and may cause bandwidth reservation adjustments to be made in accordance with the policy.

In some implementations, ingress routing device 210 may receive information that identifies the network traffic behavior associated with LSP 240, may determine a policy based on the network traffic behavior, and may implement the policy (e.g., may perform operations associated with blocks 410-430). In this way, ingress routing device 210 may alleviate the need to communicate with traffic profiling device 250, thereby conserving network resources.

Implementations described herein enable traffic profiling device 250 to determine a policy for LSP 240 based on determining network traffic behavior associated with LSP 240. Thus, implementations described herein enable traffic profiling device 250 to determine a more accurate policy for LSP 240 than as compared to a universal policy (e.g., applied to multiple LSPs 240 irrespective of a characteristic and/or type of network traffic carried by LSPs 240). In this way, traffic profiling device 250 may determine a policy for LSP 240 that reduces a sampling frequency, reduces a quantity of unnecessary bandwidth reservation adjustments, or the like. Implementations described herein may conserve processor and/or memory resources of network devices associated with LSP 240, may conserve network resources, and/or may enable network resources to be allocated to other LSPs 240 and/or traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a policy to be determined on a per-LSP basis. In this way, implementations described herein enable particular policies to be applied to particular LSPs based on network traffic behavior of the respective LSPs, rather than a universal policy being applied to each LSP. In this way, implementations described herein reduce a quantity of situations where too much or too little bandwidth is reserved for an LSP, thereby conserving network resources by preventing network traffic loss and/or enabling bandwidth to be reserved for other applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc. As used herein, a threshold value may refer to an absolute value, a percentage value, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   receive information that identifies network traffic behavior associated with a label-switched path of a plurality of label-switched paths,
      the network traffic behavior being associated with a plurality of first values associated with network traffic of the label-switched path;
   determine an automatic bandwidth adjustment policy based on the network traffic behavior,
      the automatic bandwidth adjustment policy including multiple factors,
      the multiple factors being associated with a plurality of second values, and
      the plurality of second values being determined based on the plurality of first values;
   implement the automatic bandwidth adjustment policy in association with the label-switched path,
      implementing the automatic bandwidth adjustment policy causing a bandwidth reservation of the label-switched path to be adjusted based on the automatic bandwidth adjustment policy;
   determine a quantity of bandwidth reservation adjustments that were made based on implementing the automatic bandwidth adjustment policy; and
   determine an updated automatic bandwidth adjustment policy based on the quantity of bandwidth reservation adjustments.

2. The device of claim 1, where the one or more processors are further to:
   determine another automatic bandwidth adjustment policy based on the network traffic behavior associated with the label-switched path; and
   where the one or more processors, when implementing the automatic bandwidth adjustment policy, are to:
      implement the automatic bandwidth adjustment policy in association with a first time frame and implement the other automatic bandwidth adjustment policy in association with a second time frame,
         the second time frame being different than the first time frame.

3. The device of claim 1, where the one or more processors are further to:
   provide, to another device, information that identifies the automatic bandwidth adjustment policy,
      the other device adjusting the bandwidth reservation of the label-switched path based on the automatic bandwidth adjustment policy; and
   where the one or more processors, when implementing the automatic bandwidth adjustment policy, are to:
      implement the automatic bandwidth adjustment policy based on providing the information that identifies the automatic bandwidth adjustment policy.

4. The device of claim 1, where the automatic bandwidth adjustment policy includes at least one of:
   a sample interval value,
   an adjustment interval value,
   an adjustment threshold value,
   an overflow threshold value, or
   an underflow threshold value.

5. The device of claim 1, where the one or more processors are further to:
   receive information that identifies bandwidth usage values associated with the label-switched path; and
   provide information that causes a bandwidth reservation value of the label-switched path to be adjusted based on the bandwidth usage values and the automatic bandwidth adjustment policy.

6. The device of claim 1, where the one or more processors are further to:
   determine another automatic bandwidth adjustment policy for another label-switched path of the plurality of label-switched paths,
      the other automatic bandwidth adjustment policy being different than the automatic bandwidth adjustment policy; and
   implement the other automatic bandwidth adjustment policy in association with the other label-switched path.

7. A non-transitory computer-readable medium storing instructions, the instructions comprising:
   one or more instructions that, when executed by one or more processors of a first device, cause the one or more processors to:
   receive, from a second device, a plurality of bandwidth usage values associated with a plurality of label-switched paths;
   determine an automatic bandwidth adjustment policy based on the plurality of bandwidth usage values,
      the automatic bandwidth adjustment policy including multiple factors,
      the multiple factors being associated with a plurality of second values, and
      the plurality of second values being determined based on the plurality of bandwidth usage values;
   provide, to the second device, information that identifies the automatic bandwidth adjustment policy and that causes the second device to adjust a bandwidth reservation of a label-switched path, of the plurality of label-switched paths, based on the automatic bandwidth adjustment policy;
   determine a quantity of bandwidth reservation adjustments that were made based the automatic bandwidth adjustment policy; and
   determine an updated automatic bandwidth adjustment policy based on the quantity of bandwidth reservation adjustments.

8. The non-transitory computer-readable medium of claim 7,
   where the one or more instructions, when executed by the one or more processors, further cause the one or more processors to:
   determine a variation between a minimum bandwidth usage value and a maximum bandwidth usage value associated with the label-switched path for a particular time frame, the plurality of bandwidth usage values including the minimum bandwidth usage value and the maximum bandwidth usage value; and determine an overflow threshold value based on the variation; and where the one or more instructions, that cause the one or more processors to determine the automatic bandwidth adjustment policy, cause the one or more processors to:

determine the automatic bandwidth adjustment policy based on the overflow threshold value.

9. The non-transitory computer-readable medium of claim 7, where the one or more instructions, when executed by the one or more processors, further cause the one or more processors to:

provide information that causes the second device to implement another automatic bandwidth adjustment policy in association with another label-switched path, of the plurality of label-switched paths, the other automatic bandwidth adjustment policy being different than the automatic bandwidth adjustment policy.

10. The non-transitory computer-readable medium of claim 7, where the one or more instructions, when executed by the one or more processors, further cause the one or more processors to:

determine another automatic bandwidth adjustment policy based on the plurality of bandwidth usage values; and where the one or more instructions, that cause the one or more processors to provide the information that identifies the automatic bandwidth adjustment policy, cause the one or more processors to:

provide the information that identifies the automatic bandwidth adjustment policy and the other automatic bandwidth adjustment policy to cause the second device to implement the automatic bandwidth adjustment policy at a first time and to implement the automatic bandwidth adjustment policy at a second time that is different than the first time.

11. The non-transitory computer-readable medium of claim 7, where the one or more instructions, when executed by the one or more processors, further cause the one or more processors to:

determine an amount of time where one or more bandwidth usage values, of the plurality of bandwidth usage values, are within a threshold range; and determine an adjustment interval value based on the amount of time; and where the one or more instructions, that cause the one or more processors to determine the automatic bandwidth adjustment policy, cause the one or more processors to:

determine the automatic bandwidth adjustment policy based on the adjustment interval value.

12. The non-transitory computer-readable medium of claim 7, where the one or more instructions, when executed by the one or more processors, further cause the one or more processors to:

receive, from the second device, information that identifies a statistic;

determine another automatic bandwidth adjustment policy based on the information that identifies the statistic; and provide, to the second device, information that identifies the other automatic bandwidth adjustment policy.

13. The non-transitory computer-readable medium of claim 7, where the one or more instructions, when executed by the one or more processors, further cause the one or more processors to:

determine a plurality of variation values associated with the plurality of bandwidth usage values; and determine a sample interval value based on the plurality of variation values; and where the one or more instructions, that cause the one or more processors to determine the automatic bandwidth adjustment policy, cause the one or more processors to:

determine the automatic bandwidth adjustment policy based on the sample interval value.

14. A method, comprising:

identifying, by a device, a plurality of first values associated with network traffic of a label-switched path of a plurality of label-switched paths;

determining, by the device, an adjustment policy based on the plurality of first values, the adjustment policy to include one or more factors associated with a plurality of second values, and the plurality of second values being determined based on the plurality of first values;

implementing, by the device, the adjustment policy in association with the label-switched path, a bandwidth reservation of the label-switched path being adjusted based on the adjustment policy;

determining, by the device, a quantity of bandwidth reservation adjustments that were made based on implementing the adjustment policy; and determining, by the device, an updated adjustment policy based on the quantity of bandwidth reservation adjustments.

15. The method of claim 14, further comprising:

determining another adjustment policy based on the plurality of first values; and where implementing the adjustment policy comprises:

implementing the adjustment policy in association with a first time frame and implementing the other adjustment policy in association with a second time frame.

16. The method of claim 14, further comprising:

determining an average variation associated with the plurality of first values for a plurality of time frames; and where determining the adjustment policy comprises:

determining the adjustment policy based on the average variation.

17. The method of claim 14, further comprising:

receiving the network traffic; and where identifying the plurality of first values comprises:

identifying the plurality of first values based on the network traffic.

18. The method of claim 14, further comprising:

determining a maximum bandwidth value based on the plurality of first values; and where determining the adjustment policy comprises:

determining the adjustment policy based on the maximum bandwidth value.

19. The method of claim 14, further comprising:

determining a type associated with the network traffic; and where determining the adjustment policy comprises:

determining the adjustment policy based on the type.

20. The method of claim 14, where the adjustment policy is implemented for fewer than all of the plurality of label-switched paths.

* * * * *